(12) United States Patent
Nishioka

(10) Patent No.: US 11,840,049 B2
(45) Date of Patent: Dec. 12, 2023

(54) LAMINATED GLASS FOR VEHICLE

(71) Applicant: AGC Inc., Tokyo (JP)

(72) Inventor: Tsunehisa Nishioka, Tokyo (JP)

(73) Assignee: AGC INC., Tokyo (JP)

( * ) Notice: Subject to any disclaimer, the term of this patent is extended or adjusted under 35 U.S.C. 154(b) by 776 days.

(21) Appl. No.: 16/843,219

(22) Filed: Apr. 8, 2020

(65) Prior Publication Data

US 2020/0230923 A1   Jul. 23, 2020

Related U.S. Application Data

(63) Continuation of application No. PCT/US2018/038679, filed on Oct. 17, 2018.

(30) Foreign Application Priority Data

Oct. 20, 2017 (JP) ................................. 2017-203150

(51) Int. Cl.
  *H05B 3/84* (2006.01)
  *H05B 3/86* (2006.01)
  *B32B 17/10* (2006.01)

(52) U.S. Cl.
  CPC .. *B32B 17/10385* (2013.01); *B32B 17/10036* (2013.01); *H05B 3/84* (2013.01);
  (Continued)

(58) Field of Classification Search
  CPC ........ B32B 17/10036; B32B 17/10385; B32B 17/10293; B32B 2605/006; H05B 3/86;
  (Continued)

(56) References Cited

U.S. PATENT DOCUMENTS 6,011,244 A  *  1/2000  Castle ..................... H05B 3/84
                                                        219/202
7,731,373 B2 *  6/2010  Oskarsson ........ B32B 17/10036
                                                        219/203
(Continued)

FOREIGN PATENT DOCUMENTS

EP           1605729 A2 * 12/2005  ............. B32B 17/10
EP         3 190 858 A1    7/2017
(Continued)

OTHER PUBLICATIONS

International Searching Authority, "International Search Report," issued in connection with International Patent Application No. PCT/JP2018/038679, dated Dec. 25, 2018.
(Continued)

*Primary Examiner* — Eric S Stapleton
(74) *Attorney, Agent, or Firm* — Foley & Lardner LLP

(57) ABSTRACT

A laminated glass for a vehicle includes a first glass plate, a second glass plate, an interlayer, a first busbar and a second busbar arranged such that a visible area is interposed in a predetermined direction between the first busbar and the second busbar, a plurality of electric heating wires arranged in the visible area to generate heat with a voltage applied by the first busbar and the second busbar, and a third busbar arranged at an opposite side of the visible area from the second busbar, wherein the third busbar and the first busbar are arranged such that an information acquisition area is interposed in the predetermined direction between the third busbar and the first busbar, and at least one of the electric heating wires is arranged in the information acquisition area to generate heat with a voltage applied by the third busbar and the first busbar.

8 Claims, 11 Drawing Sheets

(52) U.S. Cl.
CPC .......... *H05B 3/86* (2013.01); *B32B 2605/006* (2013.01); *H05B 2203/013* (2013.01)

(58) Field of Classification Search
CPC ................ H05B 3/84; H05B 2203/008; H05B 2203/013; H05B 2203/002; H05B 2203/011; H05B 2203/014
USPC ........................................................ 219/203
See application file for complete search history.

(56) References Cited

U.S. PATENT DOCUMENTS

| | | | | |
|---|---|---|---|---|
| 2009/0147360 | A1* | 6/2009 | Oskarsson | B32B 17/10385 |
| | | | | 359/512 |
| 2010/0258547 | A1* | 10/2010 | Chamberlain | H05B 3/84 |
| | | | | 219/203 |
| 2019/0193684 | A1* | 6/2019 | Oikawa | B60S 1/026 |

FOREIGN PATENT DOCUMENTS

| | | |
|---|---|---|
| JP | H09-207718 A | 8/1997 |
| WO | WO-2016/129699 A1 | 8/2016 |
| WO | WO-2019/107460 A1 | 6/2019 |

OTHER PUBLICATIONS

International Searching Authority, "Written Opinion," issued in connection with International Patent Application No. PCT/JP2018/038679, dated Dec. 25, 2018.

* cited by examiner

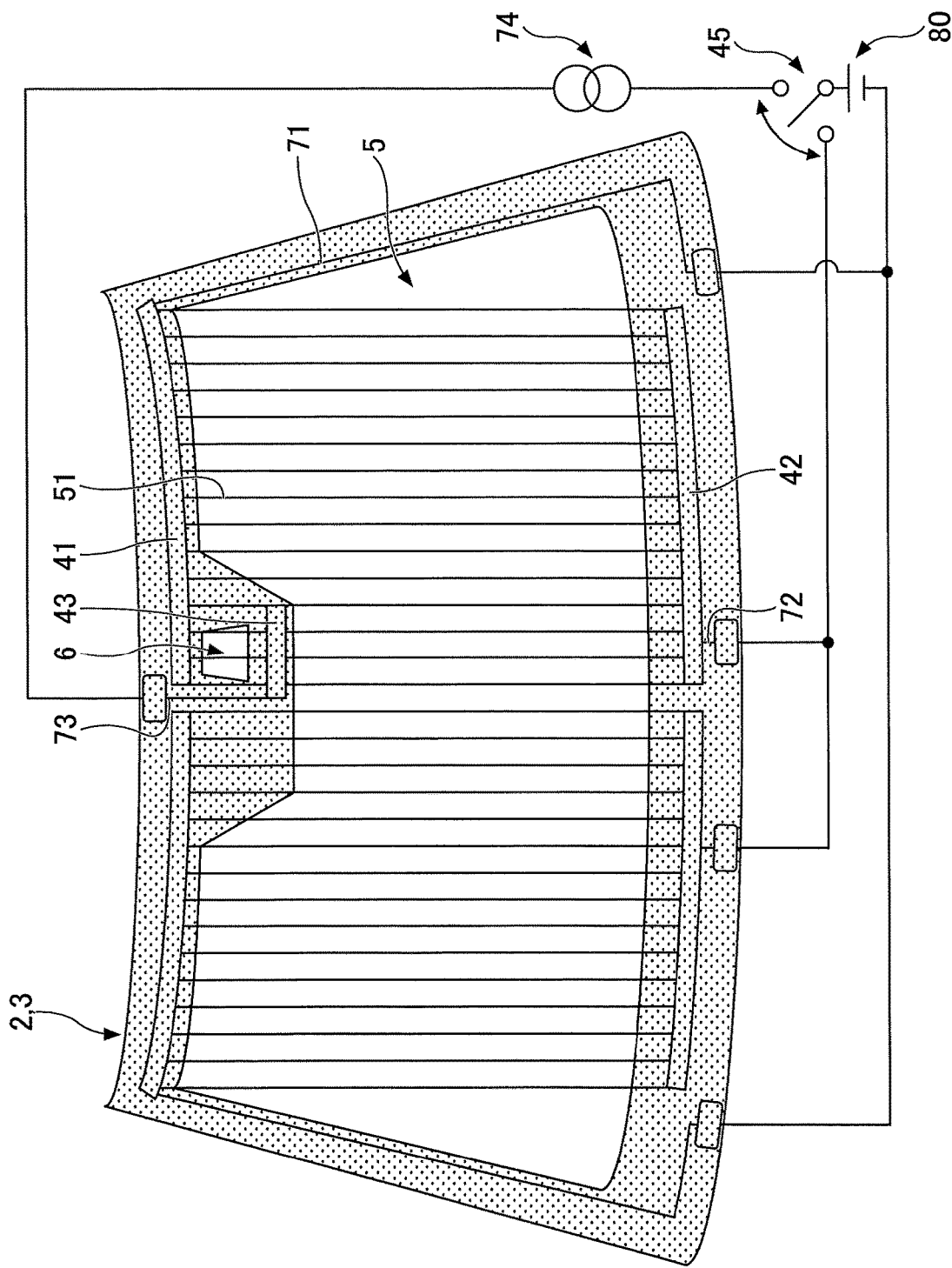

LAMINATED GLASS FOR VEHICLE

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2018/038679 filed on Oct. 17, 2018 and designating the U.S., which claims priority to Japanese Patent Application No. 2017-203150 filed on Oct. 20, 2017. The entire contents of the foregoing applications are incorporated herein by reference.

BACKGROUND OF THE INVENTION

1. Field of the Invention

The present invention relates to a laminated glass for a vehicle.

2. Description of the Related Art

Conventionally, a laminated glass is used as a window glass for a vehicle (for example, see PTL 1). FIG. 1 is a front view illustrating a heating structure in a visible area of a laminated glass for a vehicle according to a conventional example as seen from a vehicle-outer side. For the sake of simplifying drawings, FIG. 1 illustrates a smaller number of first electric heating wires 151 than the actual number of the first electric heating wires 151. FIG. 2 is a cross sectional view illustrating a laminated glass for a vehicle according to a conventional example. FIG. 3 is a front view illustrating a heating structure in an information acquisition area of a laminated glass for a vehicle according to a conventional example as seen from a vehicle-outer side. In FIG. 1 and FIG. 3, the left-hand side is the driver's seat side of right-hand drive cars, and the right-hand side is the passenger's seat side of right-hand drive cars. In FIG. 1 and FIG. 3, a dotted area indicates an arrangement area of the first light-shielding film 102 (hereinafter also referred to as a "light-shielding area"). In FIG. 1, the heating structure in an information acquisition area 106 as illustrated in FIG. 2 and FIG. 3 is omitted, and in FIG. 3, the heating structure in a visible area 105 as illustrated in FIG. 1 and FIG. 2 is omitted.

As illustrated in FIG. 2, a laminated glass 101 for a vehicle includes a first glass plate 110, a second glass plate 120 arranged to face the first glass plate 110, and an interlayer 130 bonded with the first glass plate 110 and the second glass plate 120. The first glass plate 110 is provided at a vehicle-outer side relative to the second glass plate 120. The second glass plate 120 is provided at a vehicle-inner side relative to the first glass plate 110. In general, the laminated glass 101 for the vehicle has a bent shape protruding toward the vehicle-outer side.

The laminated glass 101 for the vehicle is produced by preparing a laminate by stacking, in the following order, the first glass plate 110, the interlayer 130, and the second glass plate 120 and pressurizing and heating the produced laminate in an autoclave and the like. Before the laminate is prepared, the first glass plate 110 and the second glass plate 120 are treated with heat treatment and processed in bending formation. Alternatively, the laminate may be prepared by stacking, in the following order, the second glass plate 120, the interlayer 130, and the first glass plate 110.

As illustrated in FIG. 1, between the first glass plate 110 and the second glass plate 120, the laminated glass 101 for the vehicle includes: a first busbar 141 and a second busbar 142 arranged with the visible area 105 interposed between the first busbar 141 and the second busbar 142 in a predetermined direction (for example, a height direction); and a plurality of first electric heating wires 151 arranged in the visible area 105. The visible area 105 is an area through which the driver visually recognizes the outside of the vehicle, and is, for example, an area overlapping an opening of the first light-shielding film 102. The first busbar 141, the second busbar 142, and the first electric heating wires 151 are electrically conductive and fixed to the insulating interlayer 130, and are sandwiched between the insulating first glass plate 110 and the insulating second glass plate 120.

The first busbar 141 is arranged in an upper side portion of the laminated glass 101 for the vehicle. Conversely, the second busbar 142 is arranged in a lower side portion of the laminated glass 101 for the vehicle. The first busbar 141 and the second busbar 142 are hidden from the vehicle-outer side by the first light-shielding film 102 arranged on the first glass plate 110. The first busbar 141 and the second busbar 142 may be hidden from the vehicle-inner side by a second light-shielding film arranged on the second glass plate 120.

The first busbar 141 is connected to a first pole (for example, a negative electrode) of a power supply 180 via a first lead busbar 171. The second busbar 142 is connected to a second pole (for example, a positive electrode) of the power supply 180 via a second lead busbar 172. When a voltage is applied between the first busbar 141 and the second busbar 142, a current flows through the first electric heating wires 151, which generates Joule heat. Accordingly, fog (water droplets) and ice are removed from the surface of the laminated glass 101 for the vehicle.

As illustrated in FIG. 2, the laminated glass 101 for the vehicle may be attached with an information acquisition device 190 that acquires information about the outside of the vehicle. The information acquisition device 190 may include a camera, a radar, a rain sensor, a light sensor, an onboard communication device, and the like. The camera receives light rays such as visible rays and infrared rays from the outside of the vehicle to acquire images of the outside of the vehicle. The images acquired by the camera are used for detecting pedestrians and obstacles. The radar detects the distance to an object outside the vehicle using lasers or radio waves. The rain sensor detects the amount of water droplets attached to the laminated glass 101 for the vehicle. The detection result of the rain sensor is used to automatically start and stop the wipers. The light sensor detects the brightness of the outside of the vehicle. The detection result of the light sensor is used to automatically turn on and off the lights for illuminating the outside of the vehicle. The onboard communication device performs bidirectional communication with an infrastructure device arranged at the road to acquire road traffic information. The information acquired by the information acquisition device 190 is used for driving the vehicle.

The information acquisition device 190 is provided on a vehicle-inner side of the laminated glass 101 for the vehicle, and acquires information about the outside of the vehicle through the information acquisition area 106 of the laminated glass 101 for the vehicle. The information acquisition area 106 is an area through which the information acquisition device 190 acquires information about the outside of the vehicle, and is, for example, an area overlapping an opening of the first light-shielding film 102. As illustrated in FIG. 3, the information acquisition area 106 is provided in, for example, a recessed portion at the upper side of the visible area 105.

As described above, the information acquisition device 190 is arranged on the vehicle-inner side of the laminated glass 101 for the vehicle, and acquires information about the outside of the vehicle through the information acquisition area 106 of the laminated glass 101 for the vehicle. Therefore, when fog, ice, and the like are attached to the information acquisition area 106, the information acquisition device 190 may fail to correctly acquire information about the outside of the vehicle.

In PTL 2, as illustrated in FIG. 2, the second electric heating wire 152 is arranged on the surface of the vehicle-inner side of the second glass plate 120. As illustrated in FIG. 3, the second electric heating wire 152 is formed in an S shape, and is arranged to cross the information acquisition area 106 at three positions. When a voltage is applied to both ends of the second electric heating wire 152, the second electric heating wire 152 generates heat, so that fog and ice in the information acquisition area 106 can be removed.

PRIOR ART DOCUMENT

Patent Literature

PTL 1: Japanese Laid-Open Patent Publication No. H9-207718
PTL 2: International Publication No. 2016/129699

SUMMARY OF THE INVENTION

Technical Problem

As illustrated in FIG. 1 to FIG. 3, in a case where two busbars 141, 142 applying a voltage across both ends of the first electric heating wires 151 heating the visible area 105 of the laminated glass 101 for the vehicle and two busbars applying a voltage across both ends of the second electric heating wire 152 heating the information acquisition area 106 of the laminated glass 101 for the vehicle are separately provided, wiring becomes complicated.

The present invention has been made in view of the above problems, and it is an object of the present invention to provide a laminated glass for a vehicle that can simplify wiring of a heating structure.

Means for Solving the Problems

In order to solve the above problems, according to an aspect, provided is a laminated glass for a vehicle including:
a first glass plate;
a second glass plate arranged to face the first glass plate; and
an interlayer bonded with the first glass plate and the second glass plate,
wherein, between the first glass plate and the second glass plate, the laminated glass further includes a first busbar and a second busbar between which a visible area, through which a driver sees an outside of the vehicle, is interposed in a predetermined direction, a plurality of electric heating wires arranged in the visible area and configured to generate heat with a voltage applied by the first busbar and the second busbar, and a third busbar arranged at an opposite side of the visible area from the second busbar,
the third busbar and the first busbar are arranged such that an information acquisition area, through which an information acquisition device acquires information about the outside of the vehicle, is interposed in the predetermined direction between the third busbar and the first busbar, and
at least one of the plurality of electric heating wires is arranged in the information acquisition area and configured to generate heat with a voltage applied by the third busbar and the first busbar.

Advantageous Effects of Invention

According to an aspect of the present invention, provided is a laminated glass for a vehicle that can simplify wiring of a heating structure.

BRIEF DESCRIPTION OF THE DRAWINGS

FIG. 11 is a front view illustrating a heating structure of a laminated glass for a vehicle according to a first modification as seen from the vehicle-outer side.

DETAILED DESCRIPTION OF THE PREFERRED EMBODIMENTS

Figure 1:
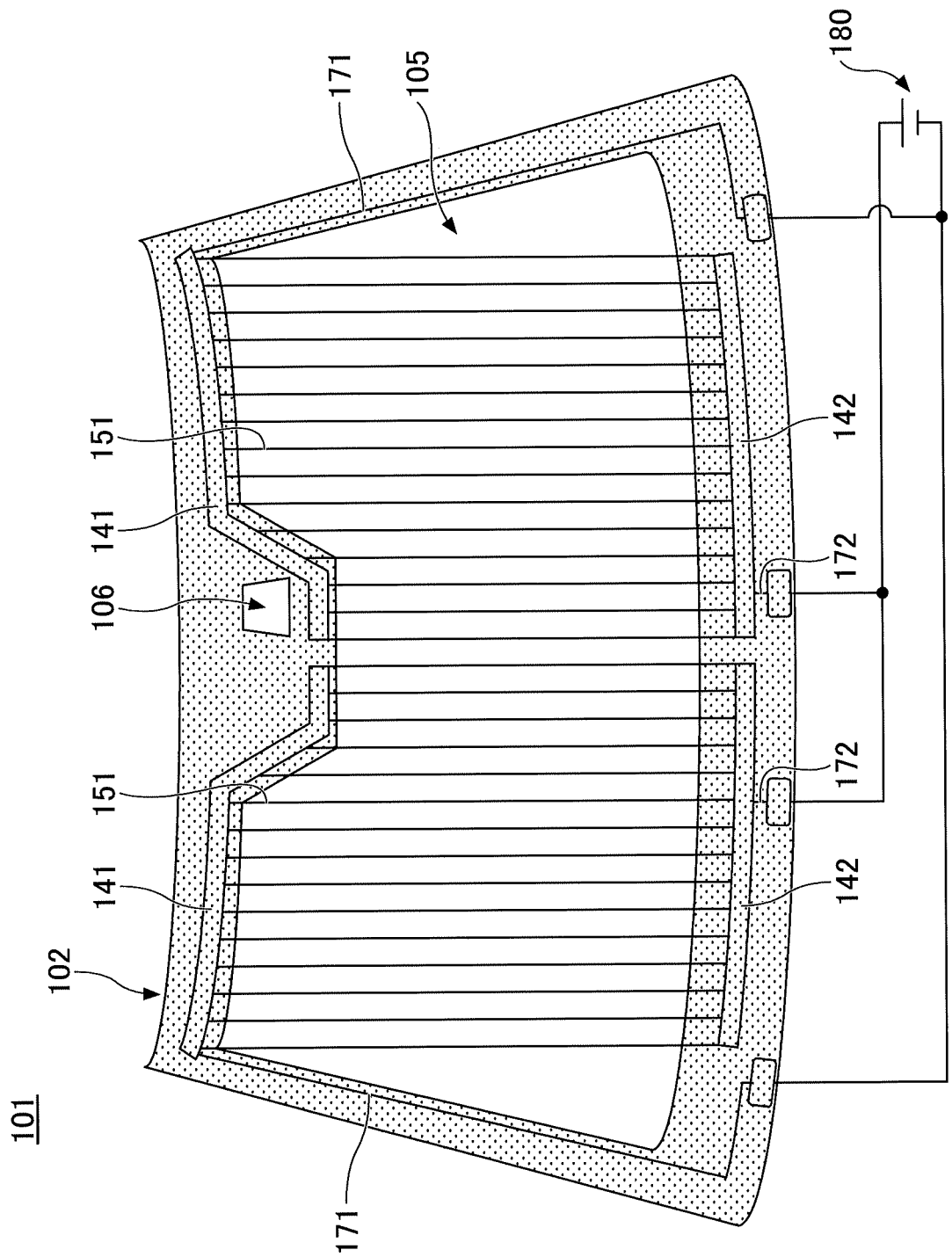
FIG. 1 is a front view illustrating a heating structure in a visible area of a laminated glass for a vehicle according to a conventional example as seen from a vehicle-outer side.
Figure 2:
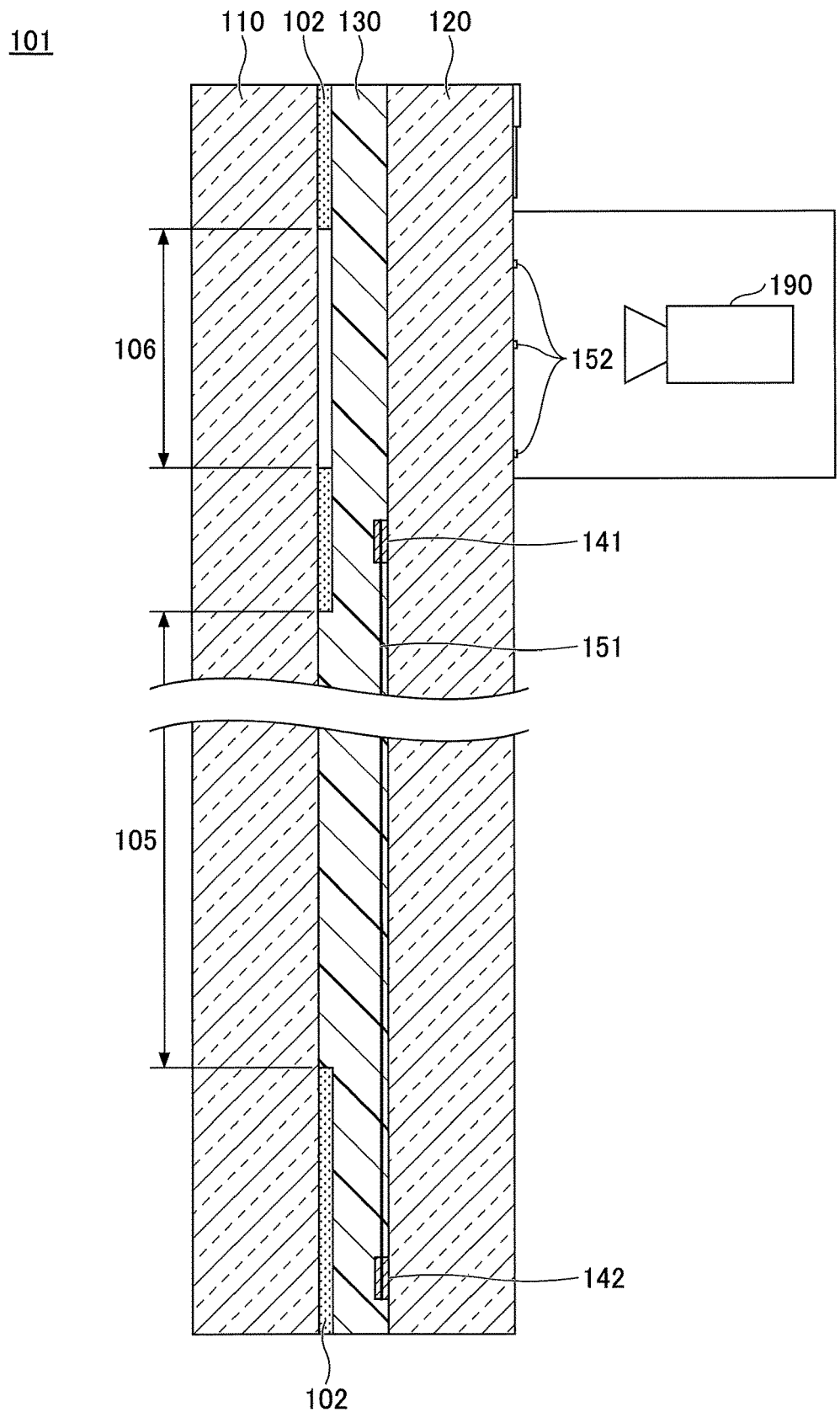
FIG. 2 is a cross sectional view illustrating a laminated glass for a vehicle according to a conventional example.
Figure 3:
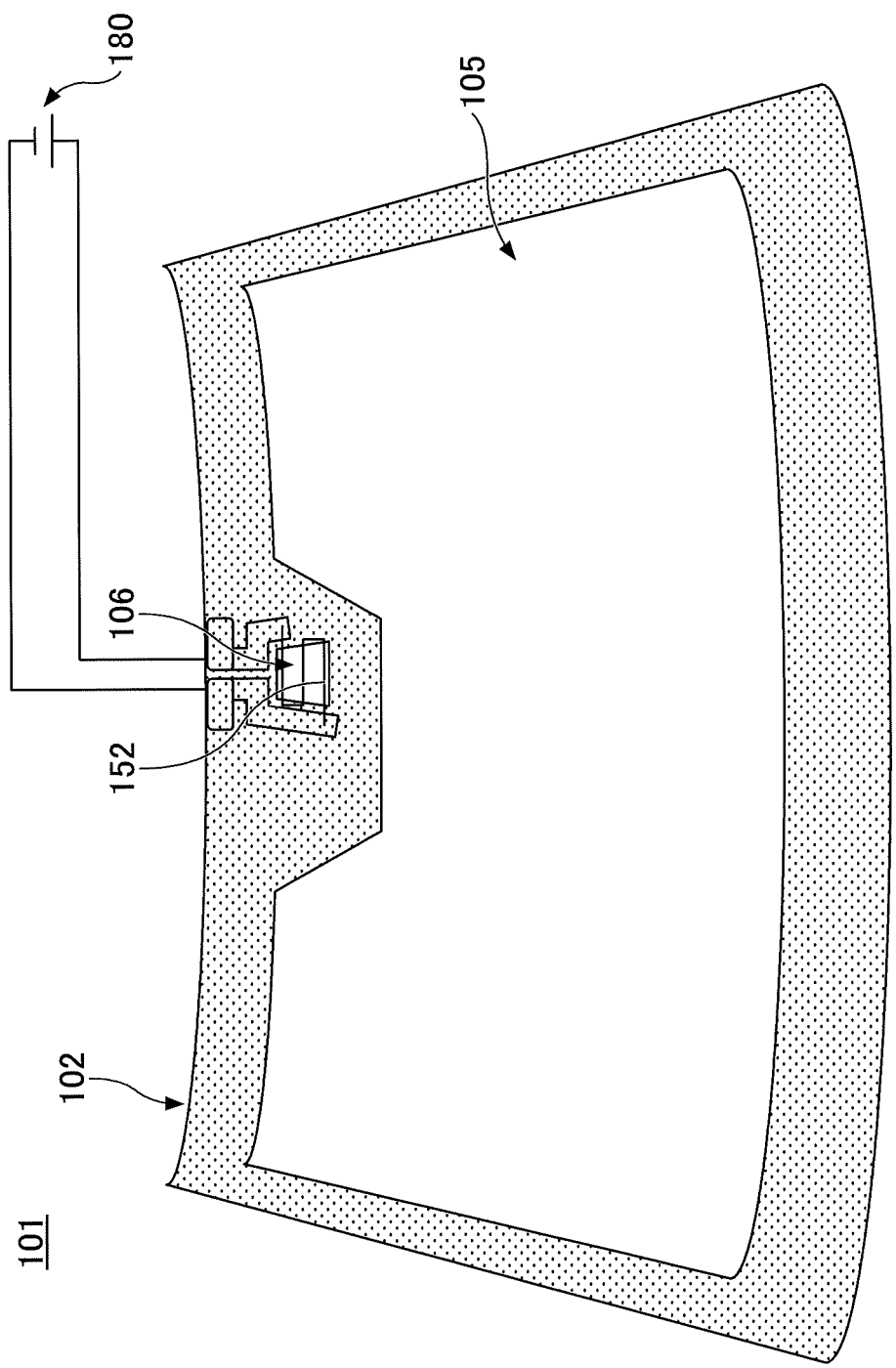
FIG. 3 is a front view illustrating a heating structure in an information acquisition area of a laminated glass for a vehicle according to a conventional example as seen from a vehicle-outer side.

Hereinafter, embodiments for carrying out the present invention will be described with reference to the drawings. In the drawings, the same or corresponding elements are denoted with the same or corresponding reference numerals, and description thereof is omitted. In the following explanation, "upper" and "lower" represent "upper side in the vertical direction" and "lower side in the vertical direction", respectively, in an orientation in which a laminated glass for a vehicle is attached to a window frame of the vehicle.

Figure 4:
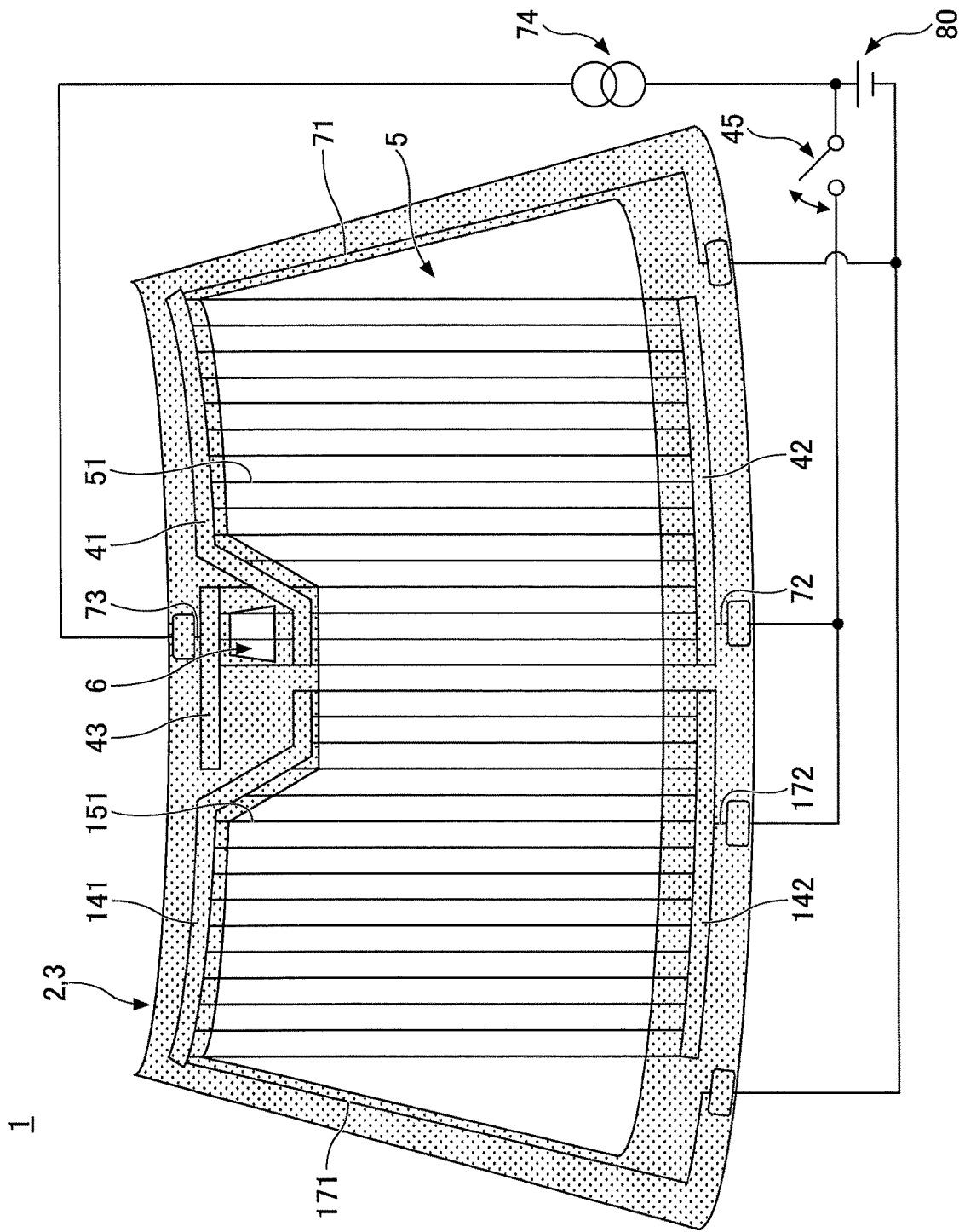
FIG. 4 is a front view illustrating a heating structure of a laminated glass for a vehicle according to an embodiment as seen from the vehicle-outer side.

In FIG. 4, the left side is the driver's seat side of the right-hand drive cars, and the right side is the passenger's seat side of right-hand drive cars. In FIG. 4, the dotted area represents an arrangement area of a first light-shielding film 2 and a second light-shielding film 3 (which may be hereinafter referred to as a "light-shielding area"). For the sake of simplifying drawings, FIG. 4 illustrates a smaller number of electric heating wires 51 than the actual number of the electric heating wires 51.

Figure 5:
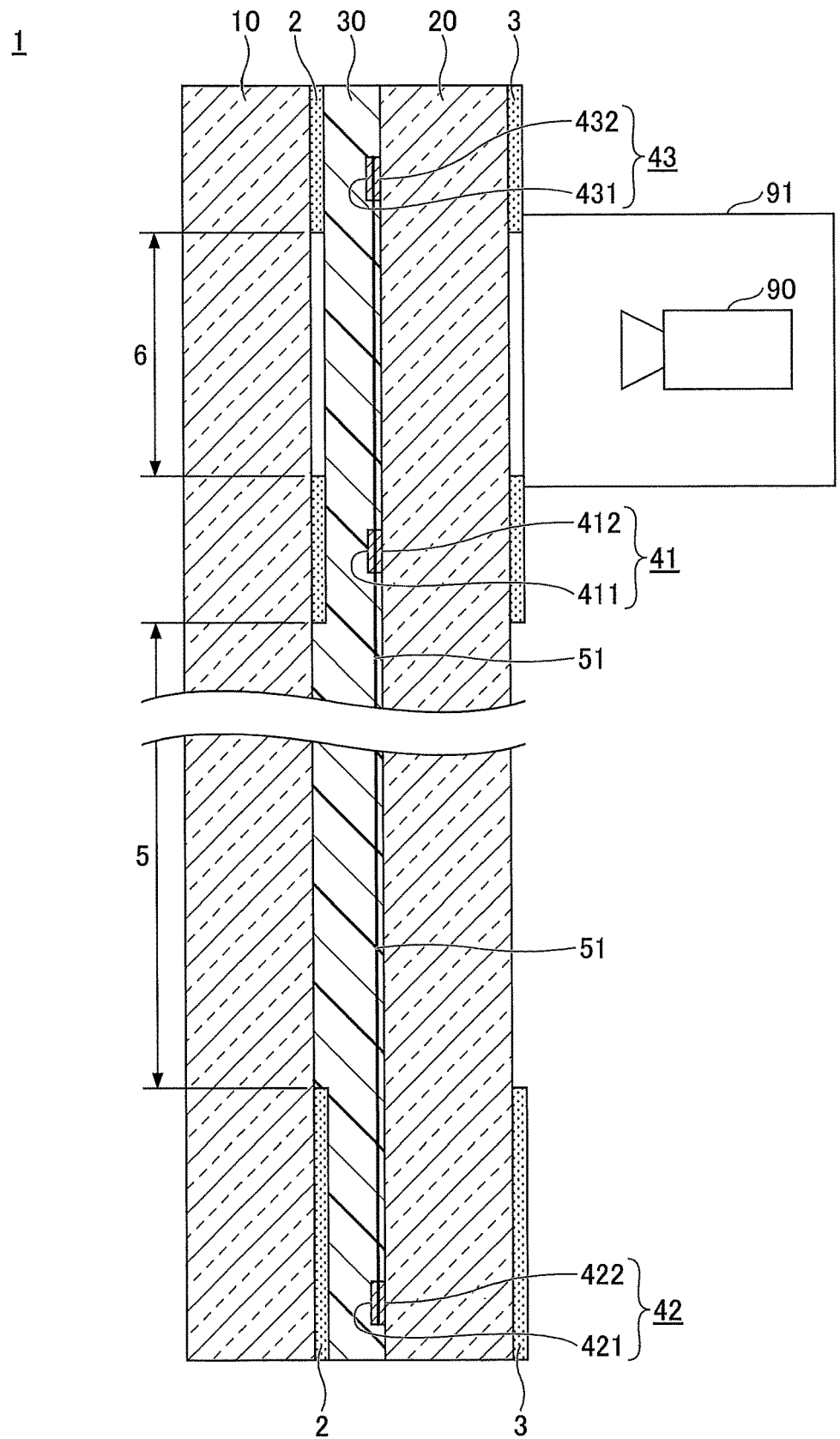
FIG. 5 is a cross sectional view illustrating a laminated glass for a vehicle according to an embodiment.

As illustrated in FIG. 5, a laminated glass 1 for a vehicle includes a first glass plate 10, a second glass plate 20 arranged to face the first glass plate 10, and an interlayer 30 bonded with the first glass plate 10 and the second glass plate 20. The first glass plate 10 is arranged at a vehicle-outer side relative to the second glass plate 20, and the second glass plate 20 is arranged at a vehicle-inner side relative to the first glass plate 10. It should be noted that the number of glass plates constituting the laminated glass 1 for the vehicle may be three or more. In a case where the number of glass plates constituting the laminated glass 1 for the vehicle is three or more, the number of interlayers may be two or more.

The first glass plate 10 may be either inorganic glass or organic glass. Examples of the inorganic glass include soda lime glass, for example. The inorganic glass may be either non-tempered glass or tempered glass. The non-tempered glass is obtained by forming molten glass into a plate and slowly cooling it. The tempered glass is formed by forming a compressive stress layer on a surface of a non-tempered glass. The tempered glass may be either a physically tempered glass (for example, heat tempered glass) or a chemically tempered glass. Examples of organic glass include transparent resins such as polycarbonate. The above is also applicable to the second glass plate 20. The plate thicknesses of the first glass plate 10 and the second glass plate 20 are not particularly limited, but are preferably 0.5 mm or more and 5.0 mm or less. The plate thicknesses of the first glass plate 10 and the second glass plate 20 may be the same or may be different from each other.

The first glass plate 10 is formed to protrude toward the vehicle-outer side. Gravity formation, press formation, and the like are used for bending formation for bending the first glass plate 10. In a case where the first glass plate 10 is a physically tempered glass, in the bending formation, the glass surface may be tempered by rapidly cooling a uniformly heated glass plate heated to a temperature at a softening point and causing compressive stress on the glass surface by a temperature difference between the glass surface and the inside of the glass. When the first glass plate 10 is chemically tempered glass, the glass surface may be tempered by causing a compressive stress on the glass surface by an ion exchange method or the like after the bending formation. The above is also applicable to the second glass plate 20.

In an outer peripheral portion of the vehicle-inner side of the first glass plate 10, the first light-shielding film 2 for hiding wiring from the vehicle-outer side is provided. The first light-shielding film 2 is obtained by firing a black ceramic paste applied to the surface of the vehicle-inner side of the first glass plate 10. The firing may be performed simultaneously with the heat treatment for the bending formation for bending the first glass plate 10.

In an outer peripheral portion of the second glass plate 20, the second light-shielding film 3 for hiding wiring and the like from the vehicle-inner side is provided. The second light-shielding film 3 is obtained by firing a black ceramic paste applied to the surface of the vehicle-inner side of the second glass plate 20. The firing may be performed simultaneously with the heat treatment for the bending formation of the second glass plate 20.

In the present embodiment, the laminated glass 1 for the vehicle includes both of the first light-shielding film 2 and the second light-shielding film 3, but may include only one of the first light-shielding film 2 and the second light-shielding film 3. Also, the first light-shielding film 2 may be provided on the surface of the vehicle-outer side of the first glass plate 10. Likewise, the second light-shielding film 3 may be provided on the surface of the vehicle-outer side of the second glass plate 20.

The interlayer 30 is made of generally available-resin, for example, thermoplastic resin such as polyvinyl butyral resin (PVB) and ethylene-vinyl acetate copolymer resin (EVA). The interlayer 30 exhibits adhesiveness when heated. The interlayer 30 may be of a single-layer structure or a multi-layer structure.

The laminated glass 1 for the vehicle is produced by preparing a laminate by stacking, in the following order, the first glass plate 10, the interlayer 30, and the second glass plate 20, and pressurizing and heating the produced laminate in an autoclave and the like. Before the laminate is prepared, the first glass plate 10 and the second glass plate 20 are treated with heat treatment and processed in bending formation. Alternatively, the laminate may be prepared by stacking, in the following order, the second glass plate 20, the interlayer 30, and the first glass plate 10.

The laminated glass 1 for the vehicle has a heating structure for removing fog (for example, water droplets) and ice on the surface. Hereinafter, the heating structure in the right half (passenger's seat side of right-hand drive cars) of the laminated glass 1 for the vehicle according to the present embodiment will be described below. The heating structure in the left half (driver's seat side of right-hand drive cars) of the laminated glass 1 for the vehicle according to the present embodiment is similar to a conventional heating structure in the left half of the laminated glass 101 for the vehicle.

The heating structure in the left half of the laminated glass 1 for the vehicle according to the present embodiment is similar to the conventional heating structure in the left half of the laminated glass 101 for the vehicle, but the heating structure in the left half may be configured in a manner similar to the heating structure in the right half (passenger's seat side) of the laminated glass 1 for the vehicle according to the present embodiment. The heating structure is appropriately selected according to the position, shape, number, and the like of information acquisition areas 6. There may be a plurality of information acquisition areas 6. This also applies to a first modification (FIG. 11).

As illustrated in FIG. 4, between the first glass plate 10 and the second glass plate 20, the laminated glass 1 for the vehicle includes: a first busbar 41 and a second busbar 42 arranged with a visible area 5 interposed in a first direction (for example, a height direction) between the first busbar 41 and the second busbar 42; and a plurality of electric heating wires 51 arranged in the visible area 5. The visible area 5 is an area through which the driver visually recognizes the outside of the vehicle, and is, for example, an area overlapping an opening of the first light-shielding film 2 and an opening of the second light-shielding film 3. In the visible area 5, the electric heating wires 51 are provided to generate heat with a voltage applied by the first busbar 41 and the second busbar 42. The line widths of the electric heating wires 51 are narrower than the line width of the first busbar 41 and the line width of the second busbar 42. Copper, aluminum, and the like are suitable as the first busbar 41 and the second busbar 42. Tungsten and the like are suitable as the electric heating wires 51.

As illustrated in FIG. 4, the first busbar 41 is provided on the upper side portion of the laminated glass 1 for the vehicle, and is hidden from the vehicle-outer side by the first light-shielding film 2 and is hidden from the vehicle-inner side by the second light-shielding film 3. As illustrated in FIG. 5, the first busbar 41 is divided into two first busbar divisional pieces 411, 412 in the plate thickness direction, and upper end portions of the electric heating wires 51 are sandwiched and fixed between the two first busbar divisional pieces 411, 412. Solder layers and the like, not illustrated, are provided on opposing surfaces of the two first busbar divisional pieces 411, 412, and the upper end portions of the electric heating wires 51 are fixed by the solder layers. Instead of the solder layer, an adhesive layer made of a conductive material may be employed.

As illustrated in FIG. 4, the second busbar 42 is provided on the lower side portion of the laminated glass 1 for the vehicle, and is hidden from the vehicle-outer side by the first light-shielding film 2 and is hidden from the vehicle-inner side by the second light-shielding film 3. As illustrated in FIG. 5, the second busbar 42 is divided into two second busbar divisional pieces 421, 422 in a plate thickness direction, and lower end portions of the electric heating wires 51 are sandwiched and fixed between the two second busbar divisional pieces 421, 422. Solder layers and the like, not illustrated, are provided on opposing surfaces of the two second busbar divisional pieces 421, 422, and the lower end portions of the electric heating wires 51 are fixed by the solder layers.

As illustrated in FIG. 4, the first busbar 41 is connected to a first pole (for example, a negative electrode) of a direct current power supply 80 via a first lead busbar 71. The second busbar 42 is connected to a second pole (for example, a positive electrode) of the direct current power supply 80 via a second lead busbar 72. As a result, a voltage is applied to the electric heating wires 51, and a current flows through the electric heating wires 51, which generates Joule heat. Copper, aluminum, and the like are suitable as the first lead busbar 71 and the second lead busbar 72.

In the present embodiment, the first pole of the direct current power supply 80 is a negative electrode, and the second pole of the direct current power supply 80 is a positive electrode, but the polarities may be reversed. Specifically, the first pole of the direct current power supply 80 may be a positive electrode, and the second pole of the direct current power supply 80 may be a negative electrode. Also, instead of the negative electrode of the direct current power supply 80, an earth electrode may be used. A car body is used as the earth electrode. Any configuration may be used as long as a voltage can be applied between the first busbar 41 and the second busbar 42.

As illustrated in FIG. 4, a plurality of electric heating wires 51 are provided with a gap in a second direction (for example, vehicle width direction) orthogonal to the first direction. A plurality of electric heating wires 51 are arranged substantially in parallel. The electric heating wires 51 are formed as straight lines as seen from a distance, but may be formed as wavy lines as seen closely.

As illustrated in FIG. 5, the laminated glass 1 for the vehicle may be attached with an information acquisition device 90 that acquires information about the outside of the vehicle. The information acquisition device 90 may include a camera, a radar, a rain sensor, a light sensor, an onboard communication device, and the like. The camera receives light rays such as visible rays and infrared rays from the outside of the vehicle to acquire images of the outside of the vehicle. The images acquired by the camera are used for detecting pedestrians and obstacles. The radar detects the distance to an object outside the vehicle using lasers or radio waves. The rain sensor detects the amount of water droplets attached to the laminated glass 1 for the vehicle. The detection result of the rain sensor is used to automatically start and stop the wipers. The light sensor detects the brightness of the outside of the vehicle. The detection result of the light sensor is used to automatically turn on and off the light illuminating the outside of the vehicle. The onboard communication device performs bidirectional communication with an infrastructure device arranged at the road to acquire road traffic information. The information acquired by the information acquisition device 90 is used for driving the vehicle.

The information acquisition device 90 is provided on a vehicle-inner side of the laminated glass 1 for the vehicle, and acquires information about the outside of the vehicle through the information acquisition area 6 of the laminated glass 1 for the vehicle. The information acquisition area 6 is an area through which the information acquisition device 90 acquires information about the outside of the vehicle, and is, for example, an area overlapping an opening of the first light-shielding film 2 and an opening of the second light-shielding film 3. As illustrated in FIG. 4, the information acquisition area 6 is provided in, for example, a recessed portion at the upper side of the visible area 5.

As described above, the information acquisition device 90 is arranged on the vehicle-inner side of the laminated glass 1 for the vehicle, and acquires information about the outside of the vehicle through the information acquisition area 6 of the laminated glass 1 for the vehicle. Therefore, when fog, ice, and the like are attached to the information acquisition area 6, the information acquisition device 90 may fail to correctly acquire information about the outside of the vehicle.

Therefore, as illustrated in FIG. 4, the laminated glass 1 for the vehicle according to the present embodiment includes a third busbar 43 arranged at an opposite side of the visible area 5 from the second busbar 42. The third busbar 43 and the first busbar 41 are arranged such that the information acquisition area 6 is interposed in the first direction between the third busbar 43 and the first busbar 41. For example, the first busbar 41 is provided between the information acquisition area 6 and the visible area 5. The first busbar 41 is formed in a crank shape so as to pass between an upper side of the visible area 5 and the information acquisition area 6 arranged in a recessed portion of the upper side of the visible area 5. At least one of the electric heating wires 51 is arranged in the information acquisition area 6 and configured to generate heat with a voltage applied by the first busbar 41 and the third busbar 43. Like the first busbar 41 and the second busbar 42, copper, aluminum, and the like are suitable as the third busbar 43.

As illustrated in FIG. 4, like the first busbar 41, the third busbar 43 is provided in the upper side portion of the laminated glass 1 for the vehicle, and is hidden from the vehicle-outer side by the first light-shielding film 2 and is hidden from the vehicle-inner side by the second light-shielding film 3. As illustrated in FIG. 5, the third busbar 43 is divided into two third busbar divisional pieces 431, 432 in a plate thickness direction, and upper end portions of the electric heating wires 51 are sandwiched and fixed between the two third busbar divisional pieces 431, 432. Solder layers and the like, not illustrated, are provided on opposing surfaces of the two third busbar divisional pieces 431, 432, and the upper end portions of the electric heating wires 51 are fixed by the solder layers.

The third busbar 43 is electrically connected via a third lead busbar 73 and the like to a direct current power supply 80. Like the first lead busbar 71 and the second lead busbar 72, copper, aluminum, and the like are suitable as the third lead busbar 73. The third busbar 43 and the second busbar 42 may be electrically connected to the same positive electrode of the same direct current power supply 80. In this case, a step-down DC-DC converter 74 may be provided between the third busbar 43 and the direct current power supply 80, so that the potential of the third busbar 43 becomes lower than the potential of the second busbar 42. The step-down DC-DC converter 74 drops the output voltage relative to the input voltage. A linear regulator, a step-down switching regulator, and the like are suitable as the step-down DC-DC converter. This can prevent an excessively high voltage from being applied between the third busbar 43 and the first busbar 41. This is because the distance between the third busbar 43 and the first busbar 41 is shorter than the distance between the second busbar 42 and the first busbar 41.

Fog, ice, and the like may attach to only the information acquisition area 6 among the visible area 5 and the information acquisition area 6. As illustrated in FIG. 5, the information acquisition area 6 is covered by the information acquisition device 90, a cover 91 housing the information acquisition device 90, and the like, and it is difficult to ventilate the inside of the cover 91. In addition, it is difficult for the driver to visually recognize the presence or absence of fog or ice in the information acquisition area 6.

Therefore, to switch the heating state of the laminated glass 1 for the vehicle, a selector switch 45 may be used. For example, with the selector switch 45, for example, the heating state of the laminated glass 1 for the vehicle is switched between a state in which both of the visible area 5 and the information acquisition area 6 are to be heated at a time and a state in which, among the visible area 5 and the information acquisition area 6, only the information acquisition area 6 is to be heated. In a case where fog, ice, and the like are not attached to the visible area 5, the heating of the visible area 5 can be stopped to reduce the power consumption.

In a case where both of the visible area 5 and the information acquisition area 6 are to be heated at a time, the selector switch 45 may electrically connect the second busbar 42 and the direct current power supply 80. Thus, a voltage can be applied between the second busbar 42 and the first busbar 41, and a voltage can be applied between the third busbar 43 and the first busbar 41. As a result, electric currents flow through the electric heating wires 51 in both of the visible area 5 and the information acquisition area 6 to generate Joule heat.

Conversely, in a case where, among the visible area 5 and the information acquisition area 6, only the information acquisition area 6 is to be heated, the selector switch 45 may electrically disconnect the second busbar 42 from the direct current power supply 80. As a result, without applying a voltage between the second busbar 42 and the first busbar 41, a voltage can be applied between the third busbar 43 and the first busbar 41. As a result, an electric current flows through the electric heating wires 51 to generate Joule heat, only in the information acquisition area 6 among the visible area 5 and the information acquisition area 6.

As illustrated in FIG. 4 and FIG. 5, at least one of the electric heating wires 51 arranged in both of the visible area 5 and the information acquisition area 6 extends from the third busbar 43 via the first busbar 41 to the second busbar 42. Specifically, at least one of the electric heating wires 51 arranged in both of the visible area 5 and the information acquisition area 6 extends, without any separation, from the third busbar 43 to the second busbar 42. Since at least one of the electric heating wires 51 arranged in both of the visible area 5 and the information acquisition area 6 is arranged, without any separation, from the third busbar 43 via the first busbar 41 to the second busbar 42, it is not necessary to provide the electric heating wires 51 separately for the visible area 5 and the information acquisition area 6, and in addition, all the electric heating wires 51 can be provided in a single step without providing a step to cut portions of the electric heating wires 51.

As described above, the laminated glass 1 for the vehicle according to the present embodiment includes the third busbar 43 arranged at an opposite side of the visible area 5 from the second busbar 42. The third busbar 43 and the first busbar 41 are arranged so that the information acquisition area 6 is interposed in the first direction between the third busbar 43 and the first busbar 41. At least one of the electric heating wires 51 is arranged in the information acquisition area 6 and is configured to generate heat with a voltage applied by the first busbar 41 and the third busbar 43. As a result, fog or ice can be removed from the information acquisition area 6, and information about the outside of the vehicle can be accurately acquired through the information acquisition area 6. Since the first busbar 41 is used as a common busbar for both of the information acquisition area 6 and the visible area 5, the number of busbars can be reduced, and wiring can be simplified.

FIG. 6 to FIG. 10 are drawings illustrating a method of producing a laminated glass for a vehicle according to an embodiment, and are drawings illustrating a method of fixing a first busbar, first electric heating wires, and the like with an interlayer according to an embodiment.

Figure 6:
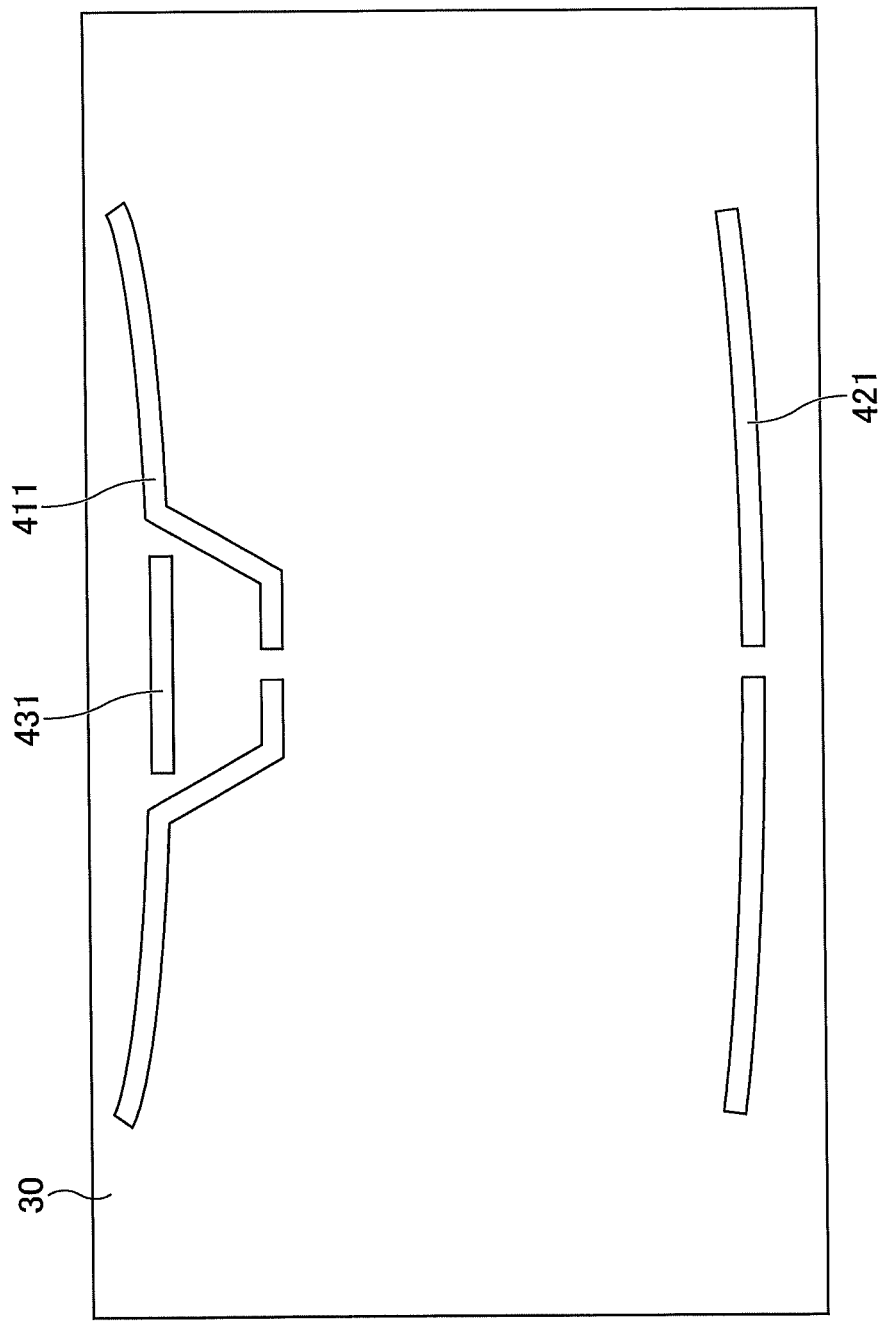
FIG. 6 is a front view illustrating a state in which first busbar divisional pieces, second busbar divisional pieces, and third busbar divisional pieces are fixed on an interlayer according to an embodiment.

First, as illustrated in FIG. 6, the first busbar divisional piece 411, the second busbar divisional piece 421, and the third busbar divisional piece 431 are fixed, in a first direction (a height direction in FIG. 6), to a surface of the interlayer 30 (for example, a surface at the vehicle-inner side). This fixation is performed by heating and pressing the first busbar divisional piece 411, the second busbar divisional piece 421, and the third busbar divisional piece 431 against the surface of the interlayer 30.

Figure 7:
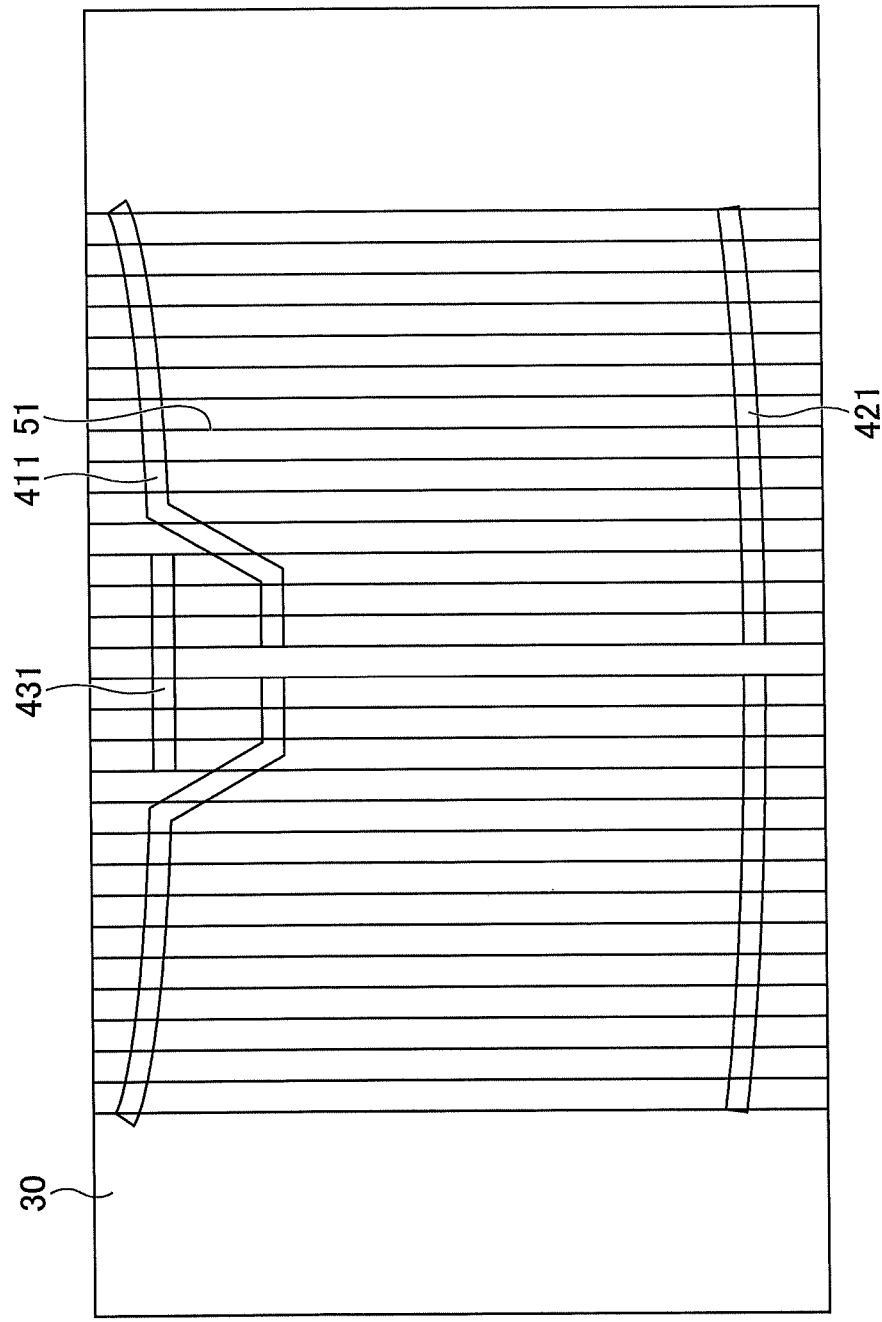
FIG. 7 is a front view illustrating a state in which electric heating wires are fixed to the interlayer of FIG. 6.

Subsequently, as illustrated in FIG. 7, a plurality of electric heating wires 51 are arranged, on the surface of the interlayer 30, side by side with a gap in the second direction (a width direction in FIG. 7). This fixation is performed by heating and pressing the electric heating wire 51 against the surface of the interlayer 30. Each electric heating wire 51 extends in the first direction (height direction in FIG. 7).

Figure 8:
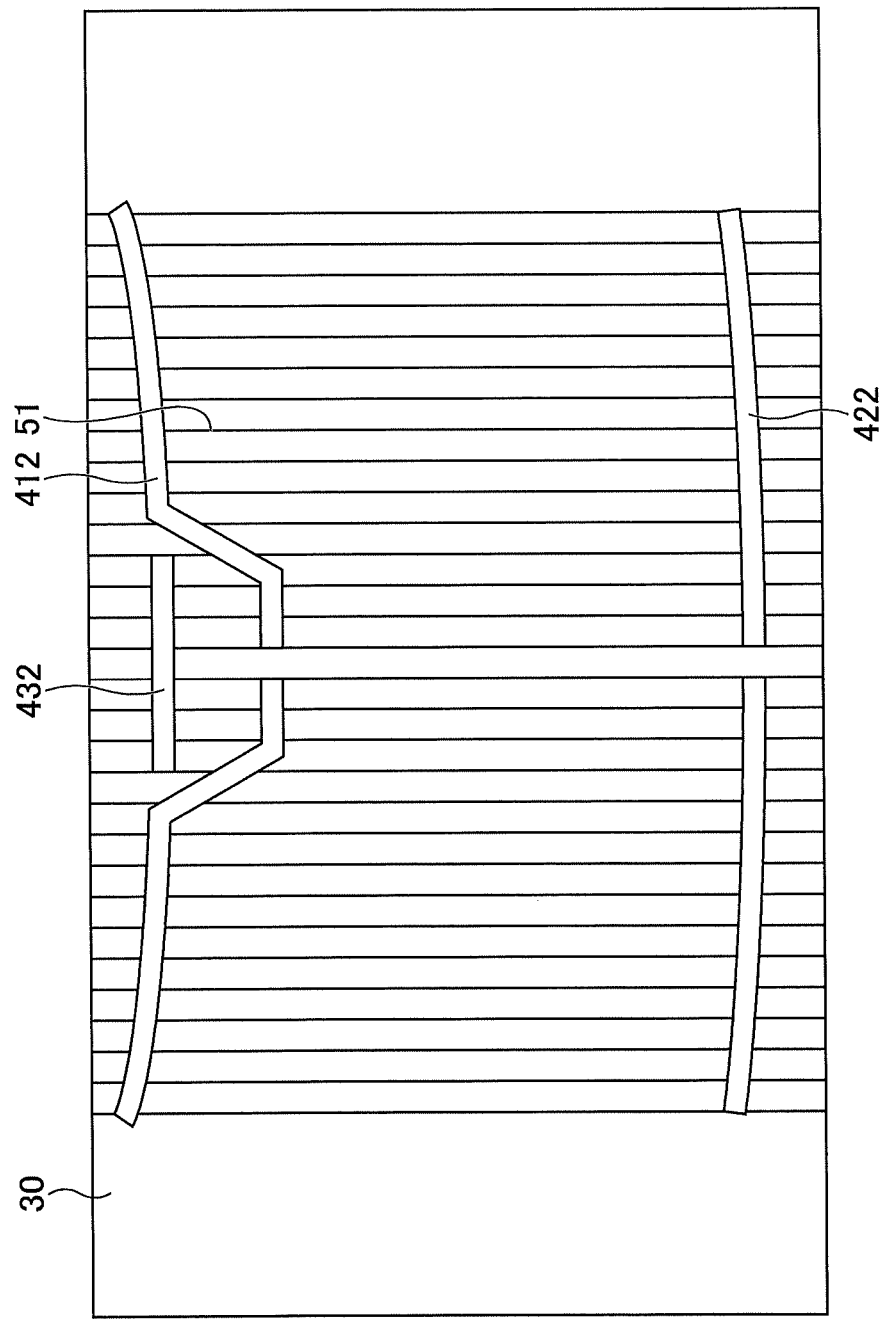
FIG. 8 is a front view illustrating a state in which first busbar divisional pieces, second busbar divisional pieces, and third busbar divisional pieces are fixed to the interlayer of FIG. 7.

Subsequently, as illustrated in FIG. 8, the first busbar divisional piece 412 is fixed to the first busbar divisional piece 411 fixed to the interlayer 30 in advance with the electric heating wires 51 sandwiched between the first busbar divisional piece 412 and the first busbar divisional piece 411. Solder layers and the like, not illustrated, are provided on opposing surfaces of the two first busbar divisional pieces 411, 412, and the electric heating wires 51 are fixed by the solder layers. In other words, as illustrated in FIG. 5, the first busbar 41 includes two first busbar divisional pieces 411, 412, and the first busbar divisional pieces 411, 412 are arranged to face each other, and the electric heating wire 51 is fixed between the two first busbar divisional pieces 411, 412.

As illustrated in FIG. 8, the second busbar divisional piece 422 is fixed to the second busbar divisional piece 421 fixed to the interlayer 30 in advance with the electric heating wires 51 sandwiched between the second busbar divisional piece 421 and the second busbar divisional piece 422. Solder layers and the like, not illustrated, are provided on opposing surfaces of the two second busbar divisional pieces 421, 422, and the electric heating wires 51 are fixed by the solder layers. In other words, as illustrated in FIG. 5, the second busbar 42 includes two second busbar divisional pieces 421, 422, and the second busbar divisional pieces 421, 422 are arranged to face each other, and the electric heating wires 51 are fixed between the two second busbar divisional pieces 421, 422.

Further, as illustrated in FIG. 8, the third busbar divisional piece 432 is fixed to the third busbar divisional piece 431 fixed to the interlayer 30 in advance with the electric heating wires 51 sandwiched between the third busbar divisional piece 431 and the third busbar divisional piece 432. Solder layers and the like, not illustrated, are provided on opposing surfaces of the two third busbar divisional pieces 431, 432, and the electric heating wires 51 are fixed by the solder layers. In other words, as illustrated in FIG. 5, the third busbar 43 includes two third busbar divisional pieces 431, 432, and the third busbar divisional piece 431, 432 are arranged to face each other, and the electric heating wire 51 is fixed between the two third busbar divisional pieces 431, 432.

Figure 9:
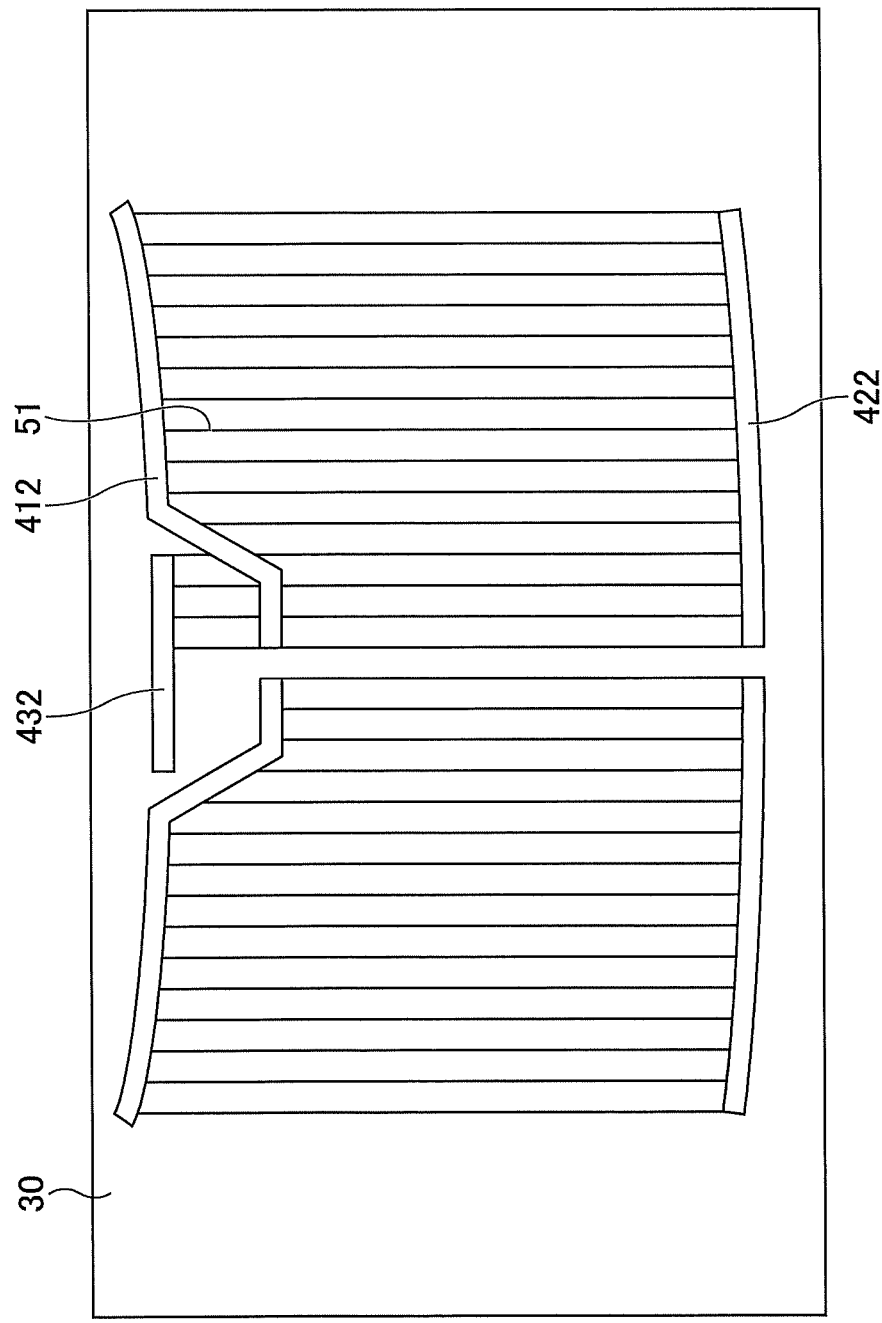
FIG. 9 is a front view illustrating a state in which redundant portions of electric heating wires of FIG. 8 are cut off.

Subsequently, as illustrated in FIG. 9, excess portions of the electric heating wires 51 are cut off.

Figure 10:
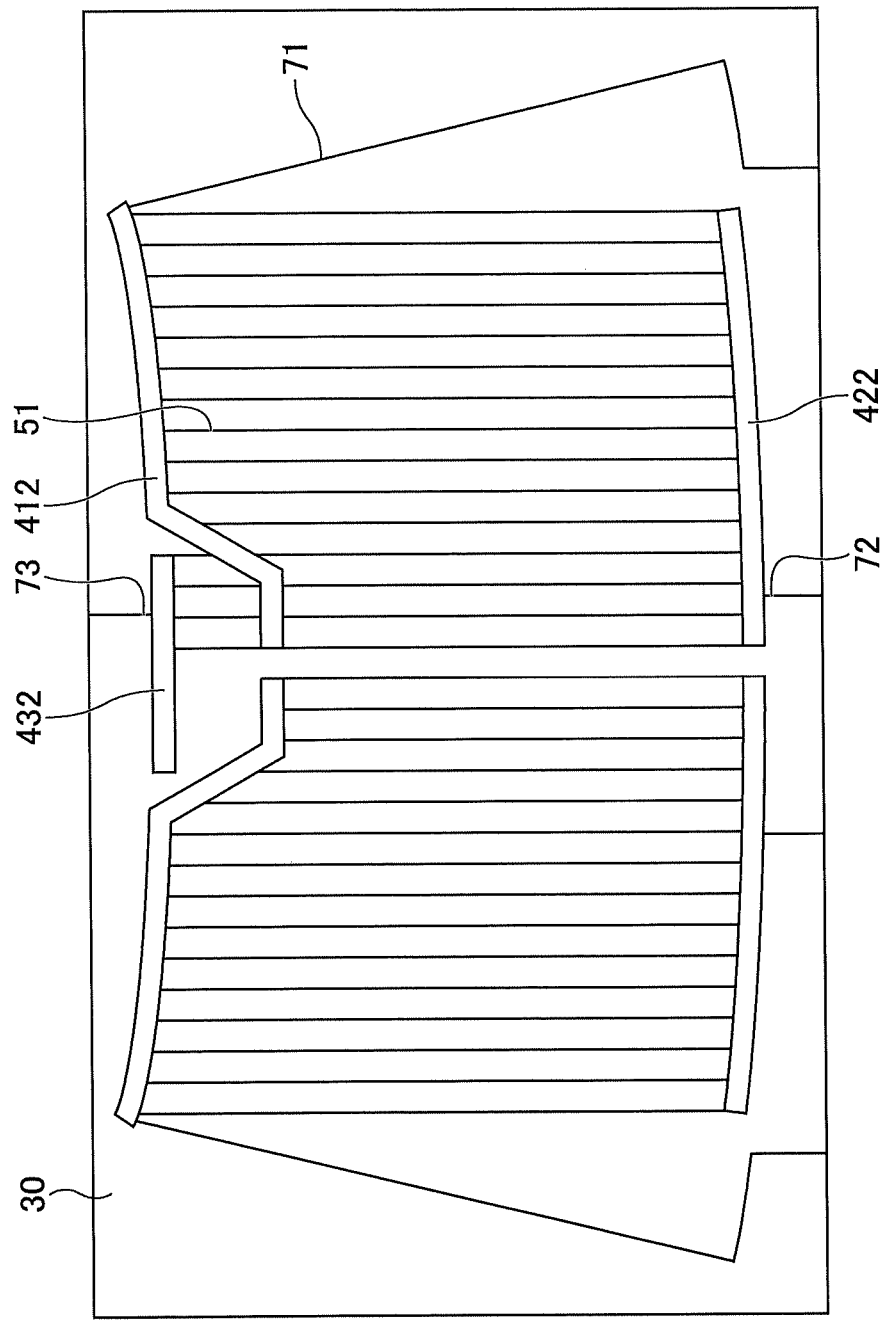
FIG. 10 is a front view illustrating a state in which a first lead busbar, a second lead busbar, and a third lead busbar are fixed to the interlayer of FIG. 9.

Finally, as illustrated in FIG. 10, the first lead busbar 71, the second lead busbar 72, and the third lead busbar 73 are fixed to the surface of the interlayer 30 (for example, a surface at the vehicle-inner side). This fixation is performed by heating and pressing the first lead busbar 71, the second lead busbar 72, and the third lead busbar 73 against the surface of the interlayer 30.

Thereafter, the interlayer 30 is used for production of a laminate. The laminate is produced by sandwiching the interlayer 30 as illustrated in FIG. 10 between the first glass plate 10 provided with the first light-shielding film 2 and the second glass plate 20 provided with the second light-shielding film 3. The laminated glass 1 for the vehicle is produced by pressurizing and heating the produced laminate in an autoclave and the like.

Although the embodiment and the like of the laminated glass for the vehicle have been described, the present invention is not limited to the above embodiment and the like, and various modifications and improvements are possible within the scope of the present invention described in the claims.

FIG. 11 is a front view illustrating a heating structure of a laminated glass for a vehicle according to a first modification as seen from the vehicle-outer side. In the embodiment explained above, as illustrated in FIG. 4, the first busbar 41 is provided between the information acquisition area 6 and the visible area 5. The first busbar 41 is formed in a crank shape so as to pass between an upper side of the visible area 5 and the information acquisition area 6 arranged in a recessed portion of the upper side of the visible area 5. Therefore, a distance between the first busbar 41 and the second busbar 42 changes in accordance with a position in the second direction (vehicle width direction). In contrast, in the present modification, as illustrated in FIG. 11, the third busbar 43 is provided between the information acquisition area 6 and the visible area 5. Therefore, the distance between the first busbar 41 and the second busbar 42 is constant irrespective of the position in the second direction. Hereinafter, the differences will be mainly described.

As illustrated in FIG. 11, in the present modification, the distance between the first busbar 41 and the second busbar 42 is constant irrespective of the position in the second direction. Therefore, the resistance values, between the first busbar 41 and the second busbar 42, of the plurality of electric heating wires 51 arranged with a gap in the second direction are the same as each other. Therefore, when a voltage is applied to the plurality of electric heating wires 51 by the first busbar 41 and the second busbar 42, electric currents of the same current value can be passed through the plurality of electric heating wires 51, and the area between the first busbar 41 and the second busbar 42 (that is, the information acquisition area 6 and the visible area 5) can be uniformly heated.

In a case where both of the visible area 5 and the information acquisition area 6 are to be heated at a time, the selector switch 45 may electrically connect the second busbar 42 and the direct current power supply 80, and may electrically disconnect the third busbar 43 and the direct current power supply 80. The third busbar 43 is provided between the first busbar 41 and the second busbar 42, and at least one of the electric heating wires 51 electrically connecting the first busbar 41 and the second busbar 42 intersects the third busbar 43 on its way. Therefore, when a voltage is applied between the first busbar 41 and the second busbar 42 to pass a current through the electric heating wires 51, a potential is generated in the third busbar according to the ratio of the distance between the first busbar 41 and the third busbar 43 to the distance between the third busbar 43 and the second busbar 42. The potential of the third busbar 43 is a potential between the potential of the first busbar 41 and the potential of the second busbar 42. A potential difference occurs between the first busbar 41 and the third busbar 43, and a potential difference occurs between the third busbar 43 and the second busbar 42. As a result, in both of the visible area 5 and the information acquisition area 6, an electric current flows through the electric heating wires 51, which generates Joule heat.

In a case where, of the visible area 5 and the information acquisition area 6, only the information acquisition area 6 is to be heated, the selector switch 45 may electrically disconnect the second busbar 42 and the direct current power supply 80, and may electrically connect the third busbar 43 and the direct current power supply 80. As a result, without applying a voltage between the second busbar 42 and the first busbar 41, a voltage can be applied between the third busbar 43 and the first busbar 41. As a result, an electric current flows through the electric heating wires 51 to generate Joule heat only in the information acquisition area 6 among the visible area 5 and the information acquisition area 6.

At this occasion, the third busbar 43 may be connected via the step-down DC-DC converter 74 to the positive electrode of the direct current power supply 80. The step-down DC-DC converter 74 drops the output voltage relative to the input voltage. This can prevent an excessively high voltage from being applied between the third busbar 43 and the first busbar 41.

As illustrated in FIG. 11, in the present modification, at least one of the electric heating wires 51 arranged in both of the visible area 5 and the information acquisition area 6 extends from the first busbar 41 via the third busbar 43 to the second busbar 42. In other words, at least one of the electric heating wires 51 arranged in both of the visible area 5 and the information acquisition area 6 extends, without any separation, from the first busbar 41 to the second busbar 42. Since at least one of the electric heating wires 51 arranged in both of the visible area 5 and the information acquisition area 6 is arranged, without any separation, from the first busbar 41 via the third busbar 43 to the second busbar 42, it is not necessary to provide the electric heating wires 51 separately for the visible area 5 and the information acquisition area 6, and in addition, all the electric heating wires 51 can be provided in a single step without providing a step to cut portions of the electric heating wires 51.

In the embodiment explained above, as illustrated in FIG. 4, the shape of the first busbar 41 and the shape of the second busbar 42 are different but may be the same as each other. Specifically, in FIG. 4, the shape of the second busbar 42 may be the same as the shape of the first busbar 41 (for example, a crank shape). This allows the distance between the first busbar 41 and the second busbar 42 to be constant irrespective of the position in the second direction.

This application claims the priority based on Japanese Patent Application No. 2017-203150 filed with the Japan Patent Office on Oct. 20, 2017, and the entire content of Japanese Patent Application No. 2017-203150 is incorporated herein by reference.

What is claimed is:

1. A laminated glass for a vehicle, comprising:
a first glass plate;
a second glass plate arranged to face the first glass plate;
an interlayer bonded with the first glass plate and the second glass plate;
a first busbar and a second busbar arranged between the first glass plate and the second glass plate and arranged such that a visible area, through which a driver sees an outside of the vehicle, is interposed in a predetermined direction between the first busbar and the second busbar;
a plurality of electric heating wires arranged between the first glass plate and the second glass plate and arranged in the visible area, the plurality of electric heating wires being configured to generate heat with a voltage applied by the first busbar and the second busbar; and
a third busbar arranged between the first glass plate and the second glass plate and arranged at an opposite side of the visible area from the second busbar,
wherein the third busbar and the first busbar are arranged such that an information acquisition area, through which an information acquisition device acquires information about the outside of the vehicle, is interposed in the predetermined direction between the third busbar and the first busbar, and
at least one of the plurality of electric heating wires is arranged in the information acquisition area and configured to generate heat with a voltage applied by the third busbar and the first busbar,
wherein the first busbar is provided between the information acquisition area and the visible area;
wherein the at least one of the plurality of electric heating wires extends from the third busbar via the first busbar to the second busbar; and
wherein the at least one the plurality of electric heating wires is arranged in both of the visible area and the information acquisition area.

2. The laminated glass for the vehicle according to claim 1, wherein the third busbar is provided between the information acquisition area and the visible area.

3. The laminated glass for the vehicle according to claim 2, wherein the at least one of the plurality of electric heating wires extends from the first busbar via the third busbar to the second busbar.

4. The laminated glass for the vehicle according to claim 1, wherein the first busbar includes two first busbar divisional pieces, and the two first busbar divisional pieces are arranged to face each other, and the plurality of electric heating wires are fixed between the two first busbar divisional pieces.

5. The laminated glass for the vehicle according to claim 1, wherein the second busbar includes two second busbar divisional pieces, and the two second busbar divisional pieces are arranged to face each other, and the plurality of electric heating wires are fixed between the two second busbar divisional pieces.

6. The laminated glass for the vehicle according to claim 1, wherein the third busbar includes two third busbar divisional pieces, and the two third busbar divisional pieces are arranged to face each other, and the at least one of plurality of electric heating wires are fixed between the two third busbar divisional pieces.

7. The laminated glass for the vehicle according to claim 1, wherein
the first busbar is connected to a first pole of a direct current power supply via a first lead busbar,
the second busbar is connected to a second pole of the direct current power supply via a second lead busbar,
the third busbar is electrically connected to the direct current power supply via a third lead busbar, and
a step-down DC-DC converter is provided between the third busbar and the direct current power supply so that a potential of the third busbar becomes lower than a potential of the second busbar.

8. The laminated glass for the vehicle according to claim 7, wherein
a selector switch is provided between the second busbar and the direct current power supply,
in a case where both of the visible area and the information acquisition area are to be heated at a time, the selector switch electrically connects the second busbar and the direct current power supply, and
in a case where, among the visible area and the information acquisition area, only the information acquisition area is to be heated, the selector switch electrically disconnects the second busbar from the direct current power supply.

* * * * *

UNITED STATES PATENT AND TRADEMARK OFFICE
CERTIFICATE OF CORRECTION

PATENT NO. : 11,840,049 B2
APPLICATION NO. : 16/843219
DATED : December 12, 2023
INVENTOR(S) : Tsunehisa Nishioka It is certified that error appears in the above-identified patent and that said Letters Patent is hereby corrected as shown below:

On the Title Page

Related U.S. Application Data (Item 63)
Please delete:
(63) Continuation of application No. PCT/US2018/038679, filed on Oct. 17, 2018.
Please replace with:
(63) Continuation of application No. PCT/JP2018/038679, filed on October 17, 2018.

Signed and Sealed this
First Day of October, 2024

Katherine Kelly Vidal
*Director of the United States Patent and Trademark Office*